Dec. 31, 1940.   R. E. ZERUNEITH   2,226,917
SAFETY CONTROL
Filed Aug. 3, 1939
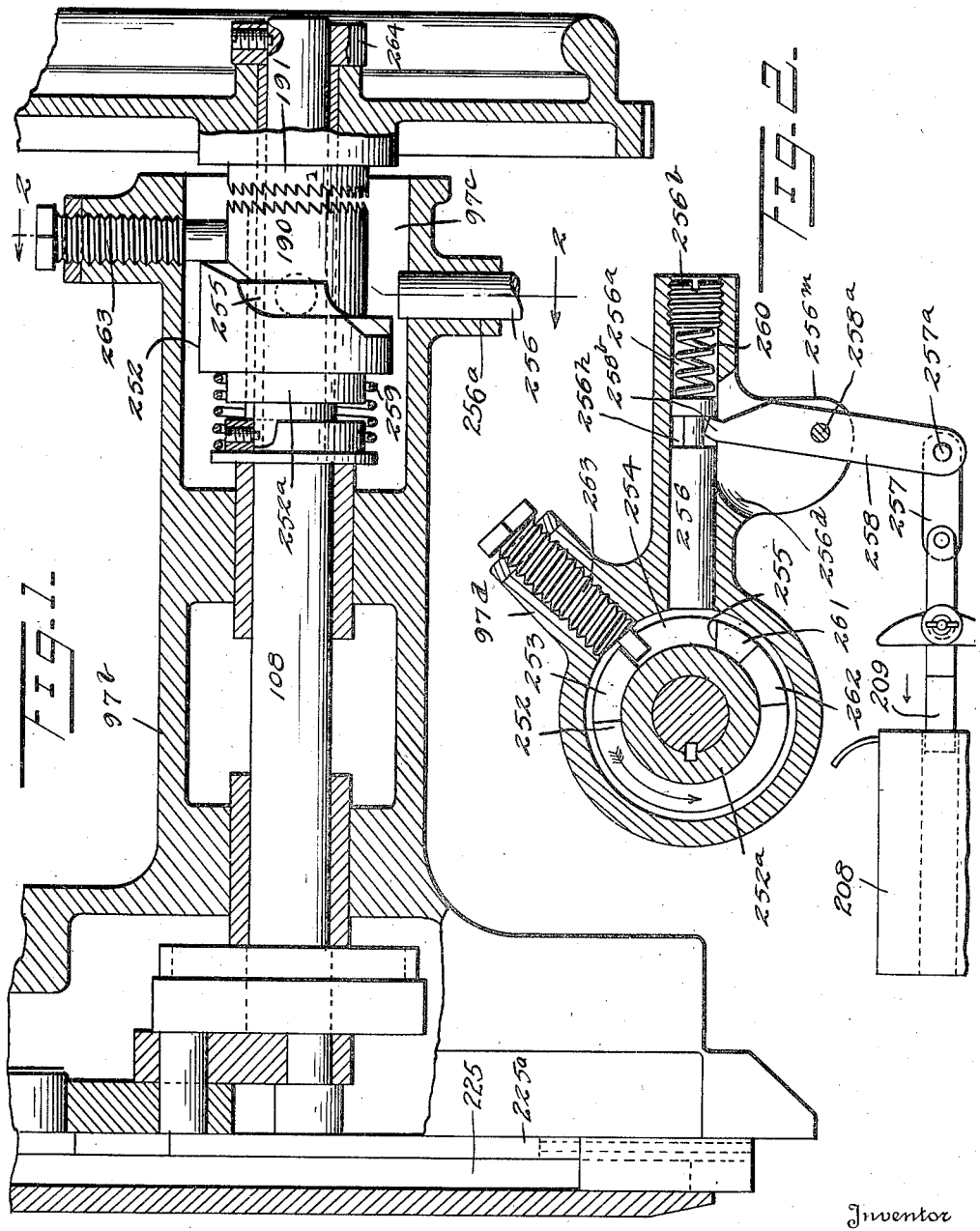
Inventor
R. E. Zeruneith
By Kimmel & Crowell
Attorneys Patented Dec. 31, 1940

2,226,917

UNITED STATES PATENT OFFICE 2,226,917

SAFETY CONTROL

Rudolph E. Zeruneith, New York, N. Y.

Application August 3, 1939, Serial No. 288,202

10 Claims. (Cl. 192—134)

This invention relates to a safety control for use in connection with power driven machinery in general, but more particularly for employment with wire stitching machines of that type for forming and driving wire staples.

The invention forming the subject matter of this application is a division of my copending application filed April 13, 1939, Serial Number 267,739.

One of the objects of the invention is to provide, in a manner as hereinafter set forth, a safety control for coupling a driving structure to a driven structure for applying power to the latter, as well as acting as a safeguard for the attendant or operator against accidental injury, such as is commonly caused when inadvertently placing one's hands between relatively approaching power driven machine parts or members such as the staple former and the staple driver of a wire stitching machine for forming and driving staples.

A further object of the invention is to provide, in a manner as hereinafter set forth, a safety control for the purpose referred to having as an element thereof a controllable latching device therefor.

A further object of the invention is to provide in a manner as hereinafter set forth, a safety control for clutching a driving element to a driven element to apply power to the latter for operating relatively approachable moving parts of the machine with which said control is associated, and with such control capable of automatically disconnecting said elements temporarily during the operation of the machine and permitting of the said moving parts to continue or follow through of their own momentum for a predetermined period and automatically connecting said elements together at the end of such period for re-applying power, provided the said moving parts during their momentum have in the meanwhile encountered no obstacle to arrest their movement whereby the hands of an operator are safeguarded from injury as it will be impossible to interpose them in the operative path of the relatively approaching power driven parts of the machine because the power is resumed only after the parts have been shifted by their momentum to an extent in their operative path to permit the hand to be slipped into said path.

Further objects of the invention are to provide, in a manner as hereinafter set forth, a safety controlling means for the purpose referred to, which is comparatively simple in its construction and arrangement, readily installed in the machine for which it is to be associated, strong, durable, thoroughly efficient in its use and comparatively inexpensive to set up.

Embodying the aforesaid objects and others which may hereinafter appear, the invention consists of the novel construction, combination and arrangement of parts as will be more specifically described and illustrated in the accompanying drawing, wherein are shown embodiments of the invention, but it is to be understood that changes, variations and modifications may be resorted to which fall within the scope of the invention as claimed.

In the drawing:

Figure 1 is a fragmentary view in longitudinal section of a wire stitching machine showing the adaptation therewith of a safety control in accordance with this invention, and Figure 2 is a section on line 2—2, Figure 1.

The safety control is illustrated as employed, by way of example, in connection with a wire stitching machine of any type including staple formers and staple drivers, but it is to be understood that the control is for employment with any type of machine for which it may be found applicable.

The form of safety control means shown provides for automatically disconnecting the power, as for instance, by temporarily disengaging the driving and driven clutch members, once during each downstroke of the relatively approachable staple forming and staple driving members (moving parts) just after the staple is formed, the said members are operated from the driven clutch member and when the latter is disengaged from the driving clutch member they are permitted to continue or follow through of their own momentum for a predetermined portion of each cycle, and for re-applying the power by re-engaging said disengaged clutch members near the very end of the downstroke of the moving parts, provided the moving parts have meanwhile encountered no obstacle interposed in their downward path. The hands of the operator, therefore, are safe from injury for it is impossible to interpose them in the downward path of said moving parts, as these latter have been moved to an extent in said path to prevent the hands being interposed in the path below said parts, since power on the downstroke is resumed only after the parts are too close to the end of their downward path to permit the hand to be slipped in the latter below said parts.

Such means may be electrically or mechanically controlled and includes a circular cam segment 252 secured to a slidable sleeve 252a having a riser surface 253 and a dwell surface 254. A stop 255 is provided at the trailing end of the dwell surface 254. The said means is shown by way of example as being electrically controlled by a solenoid 208. The said means includes a throw-out plunger 256 connected with the armature 209 of the solenoid 208.

The control means has its plunger 256 slidably mounted in an opening 256a formed in the body 97b of the machine with which said means is associated. The outer end of opening 256a is closed by a removable plug 256b which provides an abutment for one end of the controlling spring 260 for the plunger 256. The spring 260 is interposed between the inner end of plunger 256 and the inner end of plug 256b. The inner end of opening 256a communicates with the chambered portion 97c of the body 97b, and said opening also communicates intermediate its ends with a slot 256d formed in body 97b. The plunger 256 in proximity to its inner end is formed with a peripheral annular groove 256h. The body 97b includes a pair of spaced laterally extended parallel apertured ears 256m, only one shown, flush with the sides of the slot 256d. There is associated with the plunger 256 a latching member therefor. The said means not only includes the solenoid 208 and its armature 209, but also a link 257 pivotally connected at one end to the head of the armature of the solenoid and at its other end, as at 257a, to the outer end of a link or lever 258 which extends between and is pivotally connected, as at 258a, to the ears 256m. The inner end of the link or lever 258 is formed with a nose 258b which extends into the groove 256h and coacts with the walls of the latter for retracting the plunger 256 from its active position.

The control means includes a fixed throw-out pin 263 mounted in a tubular extension 97d formed on the body 97b and opening into the chambered portion 97c of the body 97b.

When the clutch throw-out plunger 256 is retracted by means of the electric solenoid connected therewith through the links 257 and 258, the sleeve 252a is freed and will be advanced by the compression spring 259, thereby engaging the clutch. When the flow of electric current through the solenoid is interrupted, the plunger spring 260 advances the throw-out plunger 256 which is then met and engaged by the revolving riser surface 253, causing the circular cam segment 252 and associated slidable sleeve 252a to be retracted, thereby disengaging the clutch.

The circular cam segment 252 further includes a second riser surface 261 and dwell surface 262, which coact with the fixed throw-out pin 263 to throw out the clutch for a period determined by the arcuate length of the dwell surface 262, and this occurs once during each complete revolution of the circular cam segment 252. If there is no obstruction interposed between the descending staple forming and driving members 225, 225a respectively and the work, and if the parts are properly lubricated, the momentum or inertia of the moving parts will suffice to carry the trailing end of the dwell surface 262 past the fixed throw-out pin 263 whereupon the compressed clutch spring 259 will re-expand, thereby re-engaging the clutch after which the moving parts will again become power driven.

At that phase of each cycle during which the dwell surface 262 rides over the fixed throw-out pin 263, the continued movement of the machine parts is due solely to their own momentum, assisted possibly by the force of gravity acting upon descending members, and accordingly, if the descending parts encounter any obstruction such as the accidentally misplaced hand of the operator, the moving parts which are then not power driven will instantly come to rest. When no obstacle is present, the entire dwell surface 262 is permitted to ride past its associated fixed throw-out pin 263, whereupon power is again applied to the moving parts to complete the downward stroke and carry the parts through their inoperative return stroke.

Although the fixed throw-out pin 263 has been shown spaced approximately 45° away from the solenoid operated clutch throw-out plunger 256, the relative angle between the two may be varied to suit the individual requirements of each application of this safety feature, and in accordance with the particular phase of each cycle during which it is desired that power be disconnected.

If desired, the throw-out pin 263 may be made adjustable in a tangential direction, thereby to vary the point at which the clutch is re-engaged. Thus, for instance, by merely rotating the throw-out pin 263, the point at which the trailing end of the dwell surface 262 clears the forward end of said pin may be advanced or retarded, thereby advancing or retarding the re-engagement of the clutch or by shifting the pin peripherally relative to the cam surface.

In the event the machine has been arrested by the presence of a foreign article, the latter may be withdrawn from its obstructing position and the machine may then be set into motion by seizing the hand wheel 264 and manually rotating the drive shaft 108 by an amount sufficient to cause the dwell surface 262 to clear the pin 263, thereby permitting re-engagement of the disengaged clutch members.

In addition to providing means for protecting the limbs of the operator, the hereinabove described construction will also readily indicate any undue friction or other improper operation of the moving parts of the machine. Thus, if the moving parts should be retarded by the development of excessive friction or by any other cause, the momentum of the moving parts will be insufficient to carry through and the machine will accordingly come to rest, and become temporarily inoperative. This situation will warn the operator that the machine is not functioning properly and should be lubricated or otherwise serviced. The machine will therefore, operate only efficiently and will automatically warn the operator of the need for servicing the same.

What I claim is:

1. A safety control for releasably coupling a driven structure to its driving means and with said structure including a bodily slidable spring-controlled rotatable element having a part formed with a cammed surface and parts for clutching said structure to said means, the combination of a normally retracted projectable spring-controlled slidable throw-out plunger disposed adjacent to said cammed surface part and providing when projected, to ride against and coact with said cammed surface to retract said element from clutching engagement, said plunger having a peripheral annular groove intermediate its ends, a combined housing and guide means for said plunger formed with a slot and a pair of spaced ears extended from the slot, actuatable means supported from their ears, extending into and coacting when actuated in one direction with the walls of said groove for retracting and holding said plunger clear of said cammed surface to release said element to clutch said driving means, and means for controlling the operation of said actuatable means.

2. A safety control for releasably coupling a driven structure to its driving means and with said structure including a bodily slidable spring-controlled rotatable element having a part formed with a pair of spaced cammed surfaces and parts for clutching said structure to said means, the combination of a normally retracted projectable spring-controlled slidable throw-out plunger for correlation with one of said cammed surfaces and providing when projected, to ride against and coact with the said cammed surface to retract said element from clutching engagement, said plunger having a peripheral annular groove intermediate its ends, a combined housing and guide means for said plunger formed with a slot and a pair of spaced ears extended from the slot, actuatable means supported from their ears, extending into and coacting when actuated in one direction with the walls of said groove for retracting and holding said plunger clear of the said cammed surface to release said element to clutch said driving means, an electrical operated means for controlling the operation of said actuatable means, and means independent of said throw-out plunger and coacting with the other cammed surface for automatically maintaining said element, during each revolution thereof temporarily from clutching engagement with said driving means for a predetermined period and to permit of the return of said element to clutching engagement at the end of such period.

3. In a wire stitching machine, an axially fixed rotatable driving member provided with a plurality of circularly distributed teeth extending therefrom in an axial direction, a spring controlled rotatable member adapted to be driven thereby, a rotatable coupling member for connecting said driving and driven members, said coupling member being axially slidable along said driven member and non-rotatable relative thereto and having a plurality of circularly distributed teeth engageable with the teeth on said driving member, a revoluble inclined cammed surface rigidly associated with said rotatable coupling member, and adapted, when encountering a relatively stationary object disposed in its path or revolution, to slide said coupling member axially along said driven member, and a transversely fixed throw-out plunger pin slidable in a direction generally perpendicular to the axis of rotation of said coupling member and having its end nearest said coupling member movable into the path of revolution of said inclined cammed surface, thereby to actuate said coupling member.

4. In power driven machinery having parts relatively approachable in power-on condition, means for automatically interrupting the application of power to said parts when said parts are relatively approaching each other, and means responsive to and operable solely at the end of a further predetermined continued relative approaching movement of said parts, provided by the momentum of said parts for thereafter automatically reapplying said power to said parts.

5. In power driven machinery having downwardly movable members relatively approachable in power-on condition, means for safeguarding the limbs of the operator against accidental injury in the downward path of said relatively approachable members comprising means for automatically freeing the moving members from their driving source when said members are relatively approaching each other during their downward path whereby a continued movement of said member in such path is provided by the momentum of said members, means preventing the reapplication of power to said moving members at least until said relatively approaching members are at the extent of the downward movement thereof provided by their momentum, and means for thereafter automatically re-engaging said moving members and their driving source.

6. In a safety control for controlling the clutching of a driven means to a driving structure therefor, the combination of a horizontally bodily shiftable rotatable clutching structure forming a part of said driven means and being formed with a cammed surface, a throw-out means coacting with said cammed surface for unclutching said driven means from the driving structure, an actuatable means for controlling the coactive relation between said throw-out means and said cammed surface to thereby control the clutching and unclutching of said clutching structure with respect to said driving means, said clutching structure including a second cammed surface spaced from the other cammed surface and means independent of said throw-out means and coacting with said second cammed surface for automatically maintaining said rotatable clutching structure during each revolution thereof temporarily from clutching engagement with said driving means for a predetermined period and to permit of the return of said clutching structure to clutching engagement at the end of such period.

7. In a safety control, a revoluble clutch member operated from a prime mover, a driven revoluble shaft upon which revolves said member, a spring-controlled slidably mounted element keyed to said shaft, said element being formed at one end with a clutching means for coaction with said clutch member to clutch the shaft to and for operation from said member, said element provided intermediate its ends with a cam formed with a pair of spaced cam surfaces spaced from said clutching means, a fixed throw-out for said element correlating with one of said surfaces for temporarily throwing out said element for a period between the starting and ending of each revolution of said shaft, and a normally inactive releasable throw-out for said element correlating with the other cam surfaces.

8. In a safety clutch, a driving clutch member, a driven clutch member axially slidable on a drive shaft and formed with a circular cam segment having primary and secondary riser surfaces and primary and secondary dwell surfaces, a spring controlled slidable plunger coacting with said primary surfaces normally forcing the driven member out of engagement with the driving member, a fixed member coacting with said secondary surfaces forcing the driven member out of engagement with the driving member during a predetermined intermediate portion of every operating cycle of said driven member.

9. In a safety clutch, a driving clutch member, a spring controlled driven clutch member axially slidable on a drive shaft and including a circular cam segment intermediate its ends having primary and secondary riser surfaces, primary and secondary dwell surfaces and a stop at the trailing end of the primary dwell surface, the said primary surfaces being of greater length than said secondary surfaces, a normally inactive latched spring controlled slidable plunger providing when released for coaction with said primary surfaces for forcing the driven member out of engagement with the driving member, and a fixed member for coaction with said secondary surfaces for forcing the driven member out of engagement with the driving member during a predetermined intermediate portion of every operating cycle of said driven member.

10. In a safety clutch, a driving clutch member, a spring controlled driven clutch member axially slidable on a drive shaft and including a circular cam segment intermediate its ends having primary and secondary riser surfaces, primary and secondary dwell surfaces and a stop at the trailing end of the primary swell surface, the said primary surfaces being of greater length than said secondary surfaces, a normally inactive latched spring controlled slidable plunger providing when released for coaction with said primary surfaces for forcing the driven member out of engagement with the driving member, and a fixed member for coaction with said secondary surfaces for forcing the driven member out of engagement with the driving member during a predetermined intermediate portion of every operating cycle of said driven member, said plunger and fixed member being spaced from each other and disposed in angular relation.

RUDOLPH E. ZERUNEITH.